United States Patent [19]

Hirtz

[11] Patent Number: 4,914,314

[45] Date of Patent: Apr. 3, 1990

[54] ANTI-THEFT DEVICE FOR MOTOR VEHICLES USING AN ELECTRONIC ENGINE CONTROL

[76] Inventor: Helmut Hirtz, Alemannenstrasse 7, D-100 Berlin 28, Fed. Rep. of Germany

[21] Appl. No.: 285,783

[22] Filed: Dec. 15, 1988

[63] Continuation-in-part of PCT DE87/00242 filed May 25, 1987.

[30] Foreign Application Priority Data

Jun. 16, 1986 [DE] Fed. Rep. of Germany ....... 3620297

[51] Int. Cl.$^4$ .................. B60R 25/04; H01R 33/96
[52] U.S. Cl. ............................... 307/10.3; 307/10.4; 200/51.09; 439/188
[58] Field of Search .................. 307/103., 10.4; 439/188, 304, 34; 200/51.09, 50 B, 51.1; 340/568

[56] References Cited

U.S. PATENT DOCUMENTS

| | | | |
|---|---|---|---|
| 3,982,803 | 9/1976 | Bennett | 200/51.1 |
| 4,687,888 | 8/1987 | Hasircoglu | 200/51.1 |
| 4,734,693 | 3/1988 | Dluhosch et al. | 340/825.31 |
| 4,749,873 | 6/1988 | Mutoh et al. | 307/10 AT |
| 4,754,255 | 6/1988 | Sanders et al. | 340/64 |
| 4,798,542 | 1/1989 | Asick et al. | 439/188 |

Primary Examiner—William M. Shoop, Jr.
Assistant Examiner—Sharon D. Logan
Attorney, Agent, or Firm—Nils H. Ljungman

[57] ABSTRACT

A vehicle anti-theft device which includes electronic control apparatus for controlling a function of a vehicle, the electronic control apparatus having anti-theft circuitry and controlling the vehicle function through an electrical cable, a plug in connection for physically connecting and disconnecting the electrical cable to and from the electronic control apparatus, the plug in connection including a first electrical contact electrically connected to the cable, a second electrical contact electrically connected to the electronic control apparatus when the plug in connection is physically connected thereto, at least one switching device having a first condition wherein the first and second electrical contacts are electrically connected and a second condition wherein they are electrically nonconnected, sensor apparatus for sensing a physical disconnection of the plug in connection from the electronic control apparatus and for placing the switching device in the second condition in response thereto, and switch setting apparatus for placing the switching device in the first condition, the switch setting apparatus having provision for using restricted access information to enable the switching device and for placing it in the first condition.

13 Claims, 3 Drawing Sheets

ANTI-THEFT DEVICE FOR MOTOR VEHICLES USING AN ELECTRONIC ENGINE CONTROL

CONTINUING APPLICATION INFORMATION

The present U.S. application is a continuation-in-part of International Patent Application No. PCT/DE87/00242, filed on May 25, 1987, U.S. Pat. No. 4,748, 061 which is, in turn, based on German Patent Application P No. 36 20 297.5, filed on June 16, 1986.

BACKGROUND OF THE INVENTION

1. Field of the Invention

The present invention relates to an anti-theft device for motor vehicles which are equipped with an electronic engine control unit.

2. Description of the Prior Art

It is known to equip motor vehicles with electronic engine controls. These controls scan the environmental factors and operating factors and control the engine functions. Furthermore, these engine controls can be used to monitor conditions and indicate faulty functioning. These engine control units are quite often standardized modules for particular vehicles and/or models, wherein a particular module is supplied as a ready made component for each vehicle model. These modules are usually provided in the form of a closed steel casing, which can be mounted for easy replacement in or on the vehicle. To connect the module, there is usually provided a multipolar plug connection, in which the signalling, measuring and control leads (and possibly other leads) align, and which serves to provide a plug connection with the replaceable module.

In the case of an anti-theft device for motor vehicles, special care must be taken to ensure that unauthorized starting of the vehicle is prevented to provide the greatest possible security. It has been shown tht it is much more important to prevent the vehicle from being driven away without authorization than it is to indicate an unauthorized start by acoustic and/or optical signals. Experience has shown that the skills of the car thieves to overcome security devices increase in parallel with the technical improvements made to such security devices. For a car thief, it is of major importance to overcome a security device in the shortest possible time. There is, therefore, a great demand for anti-theft devices, which, on the one hand, are compatible with the normal vehicle operation, while, on the other hand, the time taken to overcome them, if this is at all possible, is lengthy.

A security measure may be provided by switching off any provided electronic engine control unit. Such switching may be undertaken from outside in lockable manner. After switching off the electronic engine control unit, it is not possible to start up the vehicle. For unauthorized starting, it would be necessary to switch on again, in the module, the contact breaker circuit which is installed in the casing and which can be operated and locked from the outside. A simple switching can be prevented by known security measures, such as, for example, a security key or coded switch.

It is known that thefts of high quality vehicles are carried out in a professional manner. With a well directed professional action, switching off the described security device could be achieved by thieves obtaining the commercially available modules of the electronic engine control units for each specific vehicle model, and, when attempting a theft, use these to replace the switched off module. However, such a replacement automatically requires the removal of the multipolar plug connection from the module. From published German Patent Application No. 30 45 345, an anti-theft device for vehicles is already known, which includes a switch that interrupts an essential function of the engine, and that can be switched on by an operating device located inside the vehicle. The operating device is a switch mechanism on which various number combinations can be set. A decoder is attached to an electrical component of the engine which is essential to the functioning, and this decoder is connected by at least one electric lead to the switch mechanism and only produces an output signal when a specific specified number combination is set on the switch mechanism. This output signal of the decoder closes a contact breaker in a lead of this component.

From U.S. Patent No. 3,876,884, an anti-theft device is known which is safeguarded by the ignition key. With this known system, the ignition is designed so that a capacitive discharge ignition circuit can be connected to the induction ignition circuit. A commutator, which can be operated by the ignition key, is mounted on the said discharge ignition circuit.

OBJECT OF THE INVENTION

A principal object of the present invention is the provision of an anti-theft device for motor vehicles having electronic engine controls, wherein optimum security is ensured such that its disconnection, where possible at all, involves an extreme amount of time, work and experience.

SUMMARY OF THE INVENTION

According to the invention, a two-phase or tandem security is provided. The first security is a contact breaker circuit in the module of the electronic engine unit. The second security is a circuit installed in the part of the multipolar plug connection fixed on the vehicle, whereby this circuit can be operated from outside in a coded or lockable way and acts so that, after any unauthorized separation of the plug connection following the setting of the vehicle fixed part of the plug connection on a replacement module, the wiring is interrupted, so that it is impossible to start up the vehicle.

Overcoming the first security on the module cannot be practically carried out by manipulation of the module. Should an attempt be made by an shrewd professional thief to overcome this security measure by replacing the module, then the second security measure connected at the output side become operative, and this is impossible to overcome in a short time period without laborious work.

The contact breaker circuit installed in the module can advantageously be an electronic switch connected to a coded switchboard, which can be operated from the outside of the vehicle. It is, however, also possible to provide a key-operated switch.

The switches which are to be installed in the multipolar plug connections have two different kinds of function. On the one hand, the switches can be designed so that, in the event of any separation, namely both with authorized and unauthorized separations, a break is made in one or more wiring paths.

Switching on again (and thus an orderly connection of a replacement module) is, however, only possible by coded or key-operated switch elements. The other method of functioning consists in that a break is only made in the event of an unauthorized separation and in that, before an authorized break, the contact breaker measures which prevail in the event of a separation are blocked by a coded or key-operated switching circuit.

One aspect of the invention resides broadly in a vehicle anti-theft device, the anti-theft device including an electronic control apparatus for controlling at least one function of the vehicle; the electronic control apparatus comprising anti-theft circuitry; and the electronic control apparatus controlling the vehicle function through an electrical cable; and plug in connection apparatus for physically connecting and disconnecting the electrical cable to and from the electronic control apparatus; the plug in connection apparatus comprising at least a first electrical contact electrically connected to the electrical cable; at least a second electrical contact which is electrically connected to the electronic control apparatus when the plug in connection apparatus is physically connected to the electronic control apparatus; at least one switching apparatus having a first condition wherein the first and second electrical contacts are electrically connected and a second condition wherein the first and second electrical contacts are electrically nonconnected; sensor apparatus for sensing a physical disconnection of the plug in connection apparatus from the electronic control apparatus and for placing the at least one switching apparatus in the second condition for response thereto; and restricted access switch setting apparatus for placing the at least one switching apparatus in the first condition; the restricted access switch setting apparatus having an apparatus for using restricted access information for enabling the at least one switching apparatus and for placing same in the first condition.

The invention will now be described by way of a particular preferred embodiment, reference being had to the accompanying drawings, wherein:

DETAILED DESCRIPTION OF THE PREFERRED EMBODIMENTS

Figure 1:
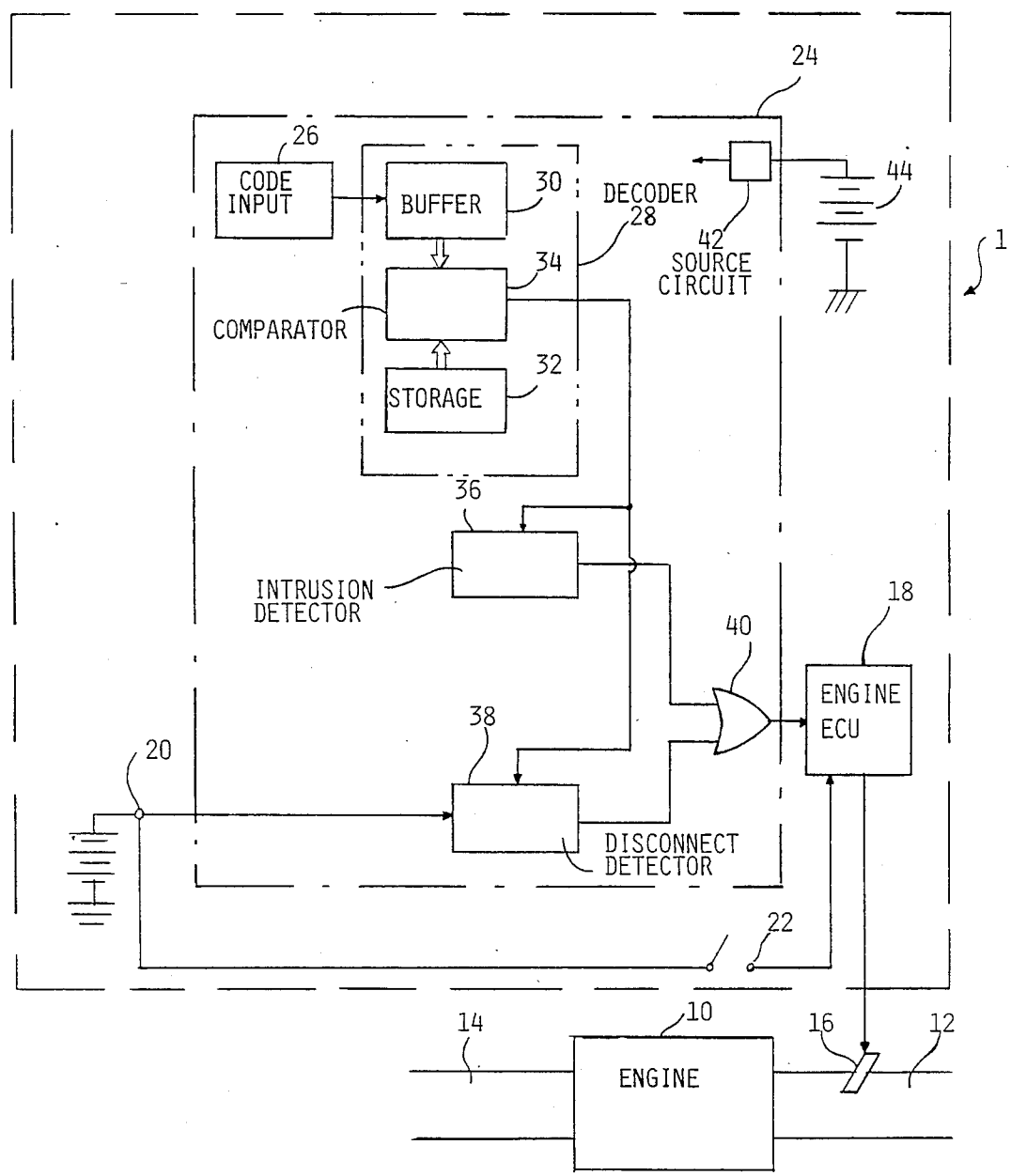
FIG. 1 is a schematic of a known prior art anti-theft device for motor vehicles using an electornic engine control unit.

Referring first to FIG. 1, there is shown a simplified schematic representation of an anti-theft device known in the prior art and disclosed in detail in U.S. Pat. No. 4,749,873, issued to Mutoh, et al., on June 7, 1988 and entitled "Anti-Theft Device for an Automobile". This patent is hereby expressly incorporated by reference with the same effect as if the entire contents thereof were set forth herein.

Briefly, U.S. Pat. No. 4,749,873 discloses an anti-theft circuit 24 which, on the detection of an attempted theft, functions so as to prevent an engine control unit (ECU) 18 from controlling an engine 10 and thereby rendering it functionally inoperative. In the embodiment disclosed, anti-theft circuit 24 renders engine 10 inoperative by causing engine control unit 18 to effectively disable a fuel injector 16 connected with an intake manifold 12. Antitheft circuit 24 includes, in part, a code input circuit 26 which is, preferalby, equipped with a ten key keyboard which generates signals according to the keys pressed. A decoding circuit 28 includes a buffer 30 for receiving signals generated by the keyboard, a storage circuit 32 for storing a selected access code, and a comparator 34 for determining when a code matching the preselected access code has or has not been entered on the keyboard.

The engine control unit 18 is connected to the vehicle battery 20 via an ignition (or key) switch 22. Further details of the circuitry disclosed in U.S. Pat. No. 4,749,873 are not discussed at length herein, but may be obtained by reference to said patent which has been incorporated herein by reference.

While U.S. Pat. No. 4,749,873 preferably discloses disablement of a fuel injector to prevent vehicle operation, it is clear that other required and necessary functions (such as ignition timing, fuel pump operation, etc.) could be similarly disabled to provide substantially similar results. Any engine control unit which disables a vehicle by substantially impairing a functional operation is contemplated as being within the scope of the present invention.

It should be noted, however, that a thief having a spare part circuit 24 can overcome the security system disclosed in U.S. Pat. No. 4,749,873 by replacing the original circuit 24 by his own spare part. Knowing the code of it, he may operate the engine accurately. By this, the security system is useless.

Beyond that, circuits 24 and 18 can easily be replaced by spare parts, the codes of which are well known to the thief. It is an essential advantage of the present invention to prevent such illegal action.

Figure 2:
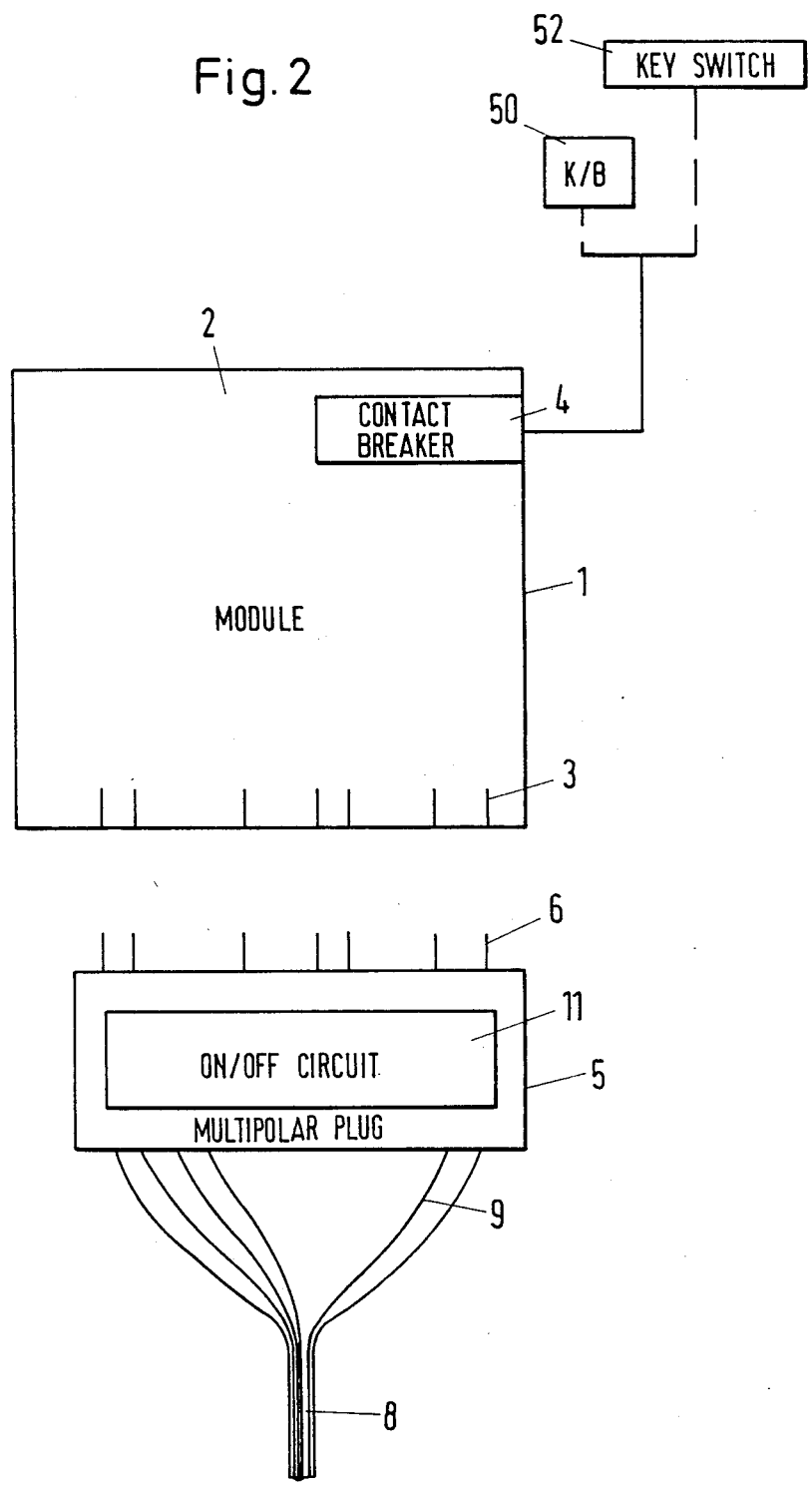
FIG. 2 is a schematic of an anti-theft device configured according to the present invention.

FIG. 2 is a diagrammatic illustration of a module 1 having a steel casing 2. This steel casing 2 contains the components of the electronic controls. This module 1 has holder and assembly fittings (not shown), by which the module 1 can be mounted in or on the vehicle and from which it can, therefore, be dismantled. The module 1 has connecting sockets 3 for the electrical connection. Numerous measuring, control, signalling and similar leads are laid in the vehicle. These are combined in the cable 8 which is fitted at the end with a multipolar plug 5. This multipolar plug 5 has pins 6 which are inserted into the sockets 3 of the module 1 to produce the connection. Single leads 9 are illustrated diagrammatically (for purposes of illustration) on the plug 5 emerging in the plug from the connecting cable 8 and leading to the associated pins 6.

At least one contact breaker circuit 4 is installed in the casing 2 of the replaceable module 1. This contact breaker circuit serves to break or switch off at least one function and/or control circuit or current and/or voltage circuit of the electronic engine control and, therefore, corresponds, in function at least, to the type of anti-theft circuit 24 known in the prior art and discussed above in connection with FIG. 1. In other words, module 1 and contact breaker circuit 4 correspond, respectively, to engine control circuit 18 and anti-theft circuit 24 of the prior art shown in FIG. 1.

This contact braker circuit 4 can be operated for example from outside by means of a coded switchboard (or keyboard, i.e., "K/B") 50. Such a coded keyboard, used in a vehicle and anti-theft device is disclosed in U.S. Pat. No. 4,754,255, issued on June 28, 1988 to Sanders et al., and entitled "User Identifying Vehicle Control and Security Device", which U.S. Pat. is hereby expressly incorporated by reference with the same effect as if its entire contents were set forth herein.

It is, however, also possible to equip this contact breaker circuit with a cylinder lock or keyswitch element 52 and a corresponding security key. Such key switches are well known in the art. One example of a keyswitch used in a vehicle protection device is shown in U.S. Pat. No. 4,734,693, issued on March 29, 1988 to Dluhosch, et al., and entitled "Switch Lock Installation". This U.S. Pat. is hereby expressly incorporated by reference with the same effect as if its entire contents were set forth herein.

This contact breaker circuit 4 serves in the event of action from outside to make the module 1, and thus the electronic engine control unit, incapable of functioning. Switching off the contact breaker circuit 4 is done in principle so that unauthorized reconnection is not possible. There is also the possibility of connecting this contact breaker circuit 4 to a remote control, wherein the control elements can be located, for example, on the instrument panel of the vehicle.

An on-off circuit 11, illustrated diagrammatically, is provided in the multipolar plug connection 5. This circuit is electrically switched in one, several or all the current or voltage paths between the pins 6 and the emerging individual wires 9. This on-off circuit 11 can comprise mechanical switch elements and/or electrical and/or electronic switch elements. This circuit 11 can be designed so that it is switched off in the event of any separation, and reconnection can only be undertaken after a manipulation which can only be carried out by an authorized user. There is, however, the possibility of designing this circuit 11 so that, in the event of an unauthorized separation, a break occurs, but that, before an authorized separation, the contact breaker function is bypassed by measures which can only be carried out by an authorized user.

By way of example, the circuit 11 can be a known electronic switch which is held in the "ON" position by a breakable closed circuit. There are various possibilities for designing the closed circuit so that it will become broken when the multipolar plug connector 5 is separated from the module 1. For example, one part of the closed circuit could be passes through the module 1. There is, however, also the possibility of providing, within the multipolar plug connector 5 itself, a switch which breaks the closed circuit in the event of separation. When reestablishing the plug connection, the closed circuit is once again switched on. However, the electronic switch itself remains switched off until this switch 11 is again switched back into the "ON" position by a coded keyboard switch. There is also the possibility of designing the electronic switch so that, in the event of an authorized separation, the breakable closed circuit can be short circuited by a switch controllable from outside. This switch can then only be operated by a coded keyboard or by means of a key. In this embodiment, a disconnection is only made in the event of an unauthorized separation.

Disconnection, in the event of an unauthorized separation, can also be carried out by a circit 11, which is held in the "ON" position by mechanical force. By way of example, a pressure element can be used. If, in the event of separation, this mechanical force is lifted, then a disconnection is effected. A switchable locking mechanism can block the lifting of this mechanical force by means of a keyboard or key so that an authorized removal is possible. This principle can also be reversed by means of a mechanical force. The action of this force can then be eliminated by the authorized user for an authorized removal.

Figure 3:
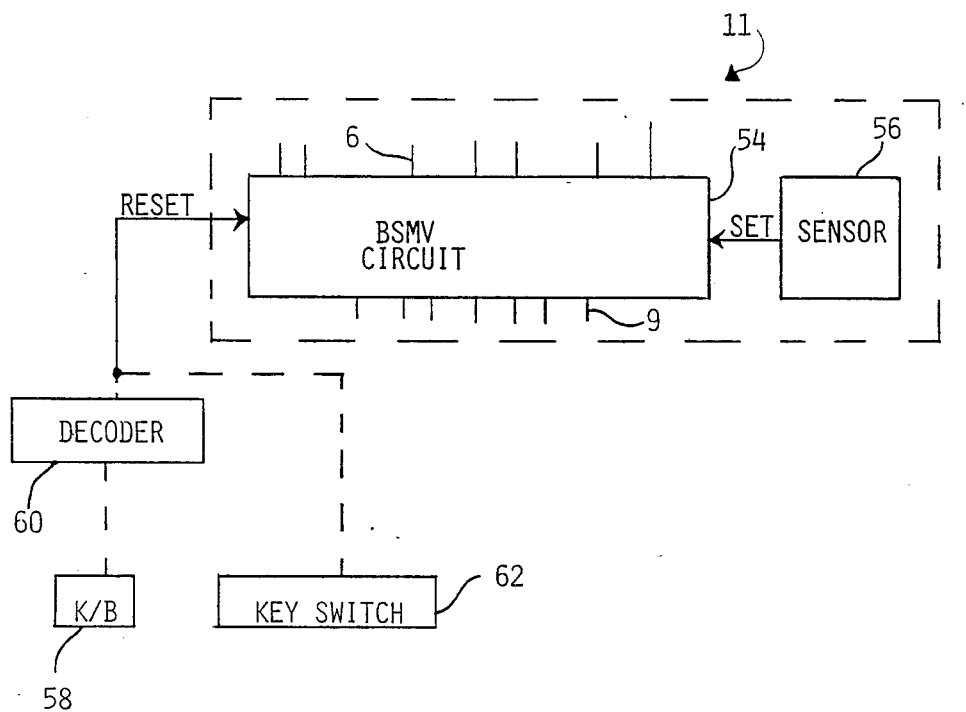
FIG. 3 is a somewhat more detailed schematic of an interruption (on or/off) circuit utilized in the anti-theft device according to the invention shown in FIG. 2.

FIG. 3 is a somewhat more detailed schematic representation of on-off circuit 11 and control circuitry associated therewith. Primarily, on-off circuit 11 includes a bistable switching circuit 54 and a sensor device or circuit 56. Bistable switching circuit 54 may, in the broadest sense, be any of the many types of bistable switching circuits well known in the art which exhibit two stable conditions, for example, an "on" condition and an "off" condition. For example, bistable switching circuit 54 may be what is generally referred to in the art as a latching relay or a series of latching relays or the electronic equivalent thereof (e.g., semiconductor latching relays, preferably of the nonvolatile type). Similarly, a bistable multivibrator (or "BSMV") circuit could be used for bistable switching circuit 54.

In one of its bistable conditions, bistable switching circuit 54 places leads 9 and pins 6 in respective electrical contact with one another, while in its second condition, such electrical contact is broken. Sensor device or circuit 56 serves to detect the physical disconnection of multipolar plug connector 5 from module 1. As noted above, various mechanical, electrical and/or electronic schemes may be used to detect such physical deconnection. Upon a separation of multipolar plug connector 5 from module 1, sensor 56 acts to place bistable switching circuit 54 in a nonconducting (or "off") condition, thereby breaking the electrical contact between leads 9a nd pins 6.

Thereafter, or prior to such physical deconnection, bistable switching circuit 54 may be placed in a conducting (or on) condition through the entry of a preselected restricted access code via a keyboard (K/B) 58, which feeds the entered information to a decoder 60, or via a key switch 62. As pointed out above, such keyboards and key switches are well known in the art and are, for example, disclosed in U.S. Pat. Nos. 4,754,255 and 4,734,693, both of which patents have been incorporated by reference herein.

The invention as described hereinabove in the context of a preferred embodiment is not to be taken as limited to all of the provided details thereof, since modifications and variations thereof may be made without departing from the spirit and scope of the invention.

What is claimed is:

1. A vehicle anti-theft device, said anti-theft device comprising:
   electronic control means for controlling at least one function of the vehicle;
   said electronic control means comprising anti-theft circuitry; and
   said electronic control means controlling said vehicle function through an electrical cable; and
   plug in connection means for physically connecting and disconnecting said electrical cable to and from said electronic control means; said plug in connection means comprising:
   at least a first electrical contact electrically connected to said electrical cable;
   at least a second electrical contact which is electrically connected to said electronic control means when said plug in connection means is physically connected to said electronic control means;
   at least one switching means having a first condition wherein said first and second electrical contacts are electrically connected and a second condition wherein said first and second electrical contacts are electrically nonconnected;

sensor means for sensing a physical disconnection of said plug in connection means from said electronic control means and for placing said at least one switching means in said second condition in response thereto; and restricted access switch setting means for placing said at least one switching means in said first condition; said restricted access switch setting means having means for using restricted access information for enabling said at least one switching means and for placing same in said first condition.

2. The vehicle anti-theft device according to claim 1, wherein said anti-theft circuitry comprising said electronic control means comprises keyboard means for entering coded information.

3. The vehicle anti-theft device according to claim 1, wherein said anti-theft circuitry comprising said electronic control means comprises key operated switch means.

4. The vehicle anti-theft device according to claim 1, wherein said at least one switching means comprises an electronic switch, wherein said sensor means comprises a closed circuit breakable by physical disconnection of said plug in connection means from said electronic control means, and wherein said restricted access switch setting means comprises a keyboard.

5. The vehicle anti-theft device according to claim 2, wherein said at least one switching means comprises an electronic switch, wherein said sensor means comprises a closed circuit breakable by physical disconnection of said plug in connection means from said electronic control means, and wherein said restricted access switch setting means comprises a keyboard.

6. The vehicle anti-theft device according to claim 4, wherein said anti-theft circuitry comprising said electronic control means comprises key operated switch means.

7. The vehicle anti-theft device according to claim 1, wherein said at least one switching means comprises an electronic switch, wherein said sensor means comprises a closed circuit breakable by physical disconnection of said plug in connection means from said electronic control means, and wherein said restricted access switch setting means comprises means for short circuiting said breakable closed circuit in response to restricted access information received from a member chosen from the group consisting essentially of a keyboard and a key activated switch.

8. The vehicle anti-theft device according to claim 2, wherein said at least one switching means comprises an electronic switch, wherein said sensor means comprises a closed circuit breakable by physical disconnection of said plug in connection means from said electronic control means, and wherein said restricted access switch setting means comprises means for short circuiting said breakable closed circuit in response to restricted access information received from a member chosen from the group consisting essentially of a keyboard and a key activated switch.

9. The vehicle anti-theft device according to claim 3, wherein said at least one switching means comprises an electronic switch, wherein said sensor means comprises a closed circuit breakable by physical disconnection of said plug in connection means from said electronic control means, and wherein said restricted access switch setting means comprises means for short circuiting said breakable closed circuit in response to restricted access information received from a member chosen from the group consisting essentialy of a keyboard and a key activated switch.

10. The vehicle anti-theft device according to claim 1, wherein said sensor means comprises means for mechanically retaining said at least one switching means in said first condition so long as said plug in connection means and said electronic control means are physically connected, and wherein said restricted access switch setting means comprises means for maintaining said at least one switching means in said first condition upon physical disconnection of said plug in connection means and said electronic control means in response to restricted access information received from a member chosen from the group consisting essentially of a keyboard and a key activated switch.

11. The vehicle anti-theft device according to claim 2, wherein said sensor means comprises means for mechanically retaining said at least one switching means in said first condition so long as said plug in connection means and said electronic control means are physically connected, and wherein said restricted access switch setting means comprises means for maintaining said at least one switching means in said first condition upon physical disconnection of said plug in connection means and said electronic control means in response to restricted access information received from a member chosen from the group consisting essentially of a keyboard and a key activated switch.

12. The vehicle anit-theft device according to claim 3, wherein said sensor means comprises means for mechanically retaining said at least one switching means in said first condition so long as said plug in connection means and said electronic control means are physically connected, and wherein said restricted access switch setting means comprises means for maintaining said at least one switching means in said first condition upon physical disconnection of said plug in connection means and said electronic control means in response to restricted access information received from a member chosen from the group consisting essentially of a keyboard and a key activated switch.

13. A vehicle anti-theft device, said anti-theft device comprising:

electronic control means for controlling at least one function of the vehicle;

said electronic control means controlling said vehicle function through anelectrical cable; and plug in connection means for physically connecting and disconnecting said electrical cable to and from said electronic control means; said plug in connection means comprising:

at least a first electrical contact electrically connected to said electrical cable;

at least a second electrical contact which is electrically connected to said electronic control means when said plug in connection means is physically connected to said electronic control means;

at least one switching means having a first condition wherein said first and second electrical contacts are electrically connected and a second condition wherein said first and second electrical contacts are electrically nonconnected;

sensor means for sensing a physical disconnection of said plug in connection means from said electronic control means and for placing said at least one switching means in said second condition in response thereto; and
restricted access switch setting means for placing said at least one switching means in said first condition; said restricted access switch setting means having means for using restricted access information for enabling said at least one switching means and for placing same in said first condition.

* * * * *

UNITED STATES PATENT AND TRADEMARK OFFICE
CERTIFICATE OF CORRECTION

PATENT NO. : 4,914,314

DATED : April 3, 1990

INVENTOR(S) : Helmut HIRTZ

It is certified that error appears in the above-identified patent and that said Letters Patent is hereby corrected as shown below:

Title page:

In the inventor section, delete "D-100", and insert --D-1000--.

In column 1, lines 8-9, delete "U.S. Pat. No. 4,748,061".

Signed and Sealed this

Ninth Day of July, 1991

Attest:

HARRY F. MANBECK, JR.

Attesting Officer

Commissioner of Patents and Trademarks